United States Patent
Liebel et al.

(10) Patent No.: US 11,198,199 B2
(45) Date of Patent: Dec. 14, 2021

(54) METHOD FOR PRODUCING A SHEET METAL BLANK

(71) Applicant: SCHULER AUTOMATION GMBH & CO. KG, Hessdorf (DE)

(72) Inventors: Martin Liebel, Alfeld (DE); Manuel Hunger, Fuerth (DE); Michael Robert Kronthaler, Bachenbuelach (CH)

(73) Assignee: SCHULER PRESSEN GMBH, Hessdorf (DE)

( * ) Notice: Subject to any disclaimer, the term of this patent is extended or adjusted under 35 U.S.C. 154(b) by 571 days.

(21) Appl. No.: 15/735,040

(22) PCT Filed: Jun. 10, 2016

(86) PCT No.: PCT/EP2016/063317
§ 371 (c)(1),
(2) Date: Dec. 8, 2017

(87) PCT Pub. No.: WO2016/198612
PCT Pub. Date: Dec. 15, 2016

(65) Prior Publication Data
US 2020/0039003 A1    Feb. 6, 2020

(30) Foreign Application Priority Data

Jun. 12, 2015  (DE) ............... 10 2015 210 847.3
Jul. 2, 2015   (DE) ............... 10 2015 212 444.4

(51) Int. Cl.
*B23K 26/38*   (2014.01)
*B23K 26/00*   (2014.01)
(Continued)

(52) U.S. Cl.
CPC .......... *B23K 26/38* (2013.01); *B23K 26/0093* (2013.01); *B23K 26/0604* (2013.01);
(Continued)

(58) Field of Classification Search
CPC .. B23K 26/362; B23K 26/0846; B23K 26/38; B23K 26/361; B23K 26/0093;
(Continued)

(56) References Cited

U.S. PATENT DOCUMENTS 4,032,243 A * 6/1977 Keifert .................. B23K 9/23
                                                403/272
4,037,073 A * 7/1977 Becker ................. B23K 11/163
                                                219/92

(Continued)

FOREIGN PATENT DOCUMENTS

DE    195 06 768 A1    8/1995
DE    101 35 611 A1    2/2003
(Continued)

OTHER PUBLICATIONS

PCT/ISA/210, "International Search Report for International Application No. PCT/EP2016/063317", dated Sep. 16, 2016.
(Continued)

*Primary Examiner* — Eric S Stapleton
(74) *Attorney, Agent, or Firm* — Manabu Kanesaka

(57) ABSTRACT

The invention relates to a method to produce a metal blank with a predetermined contour, with the following steps: continuously moving the metal strip in a transport direction x; concurrently removing material from the surface of a top of a metal strip in at least one predetermined surface section by ablation by means of a first laser that is a component of a first removal device, and then concurrently cutting the metal strip along a cutting path corresponding to the contour of the metal blank by means of at least one second laser that is a component of a cutting device provided downstream of the first removal device; the surface section of an upstream metal blank being produced simultaneously with the cutting of a downstream metal blank.

11 Claims, 2 Drawing Sheets

Figure 1:
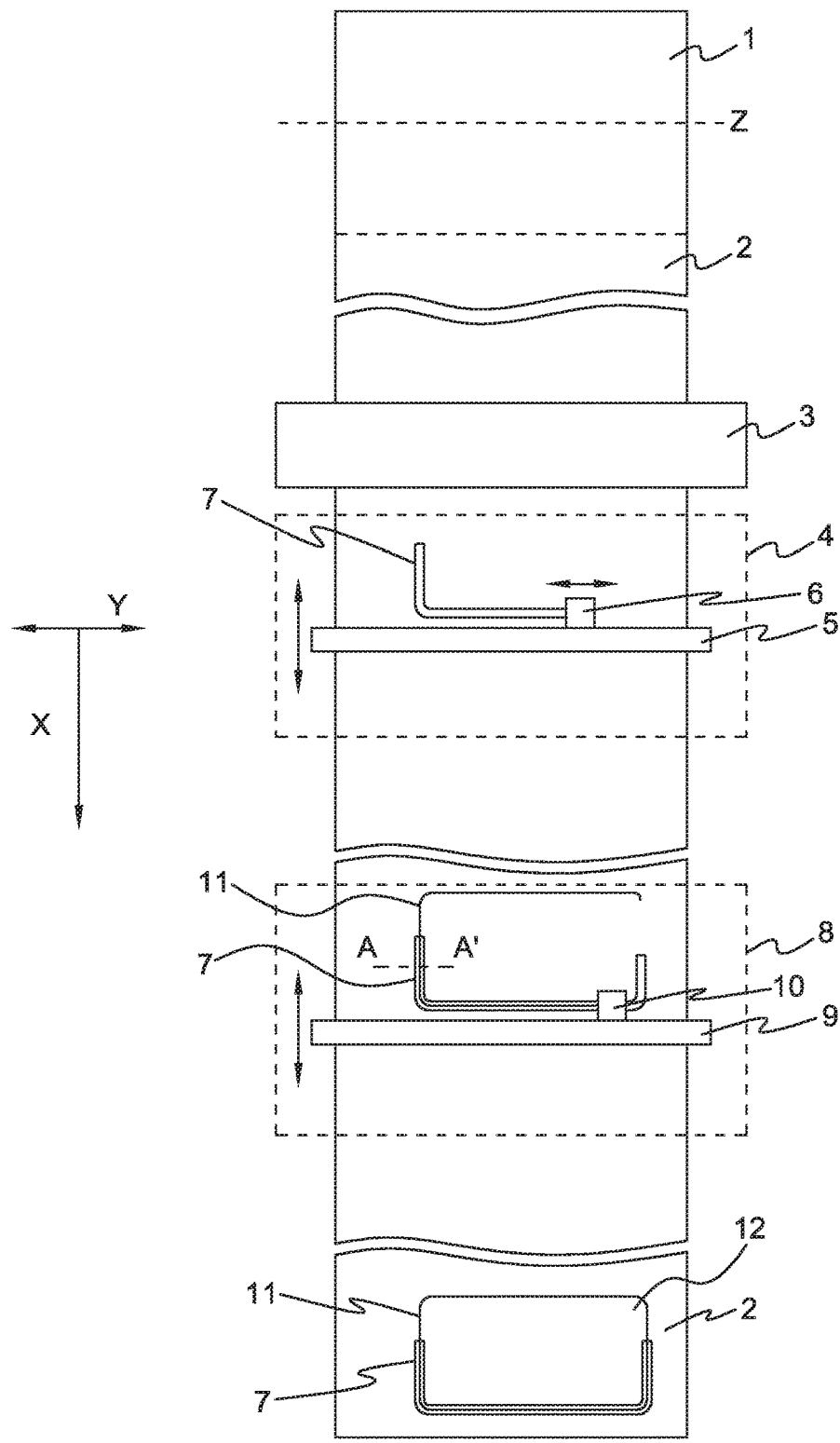

(51) Int. Cl.
*B23K 26/06* (2014.01)
*B23K 26/08* (2014.01)
*B23K 26/362* (2014.01)
*B23K 103/16* (2006.01)
*B23K 101/16* (2006.01)

(52) U.S. Cl.
CPC ...... *B23K 26/0846* (2013.01); *B23K 26/0876* (2013.01); *B23K 26/362* (2013.01); *B23K 2101/16* (2018.08); *B23K 2103/166* (2018.08)

(58) Field of Classification Search
CPC ............ B23K 26/0604; B23K 26/0876; B23K 2101/16; B23K 2101/34; B23K 2103/166
USPC .................................................. 219/121.72
See application file for complete search history.

(56) References Cited

U.S. PATENT DOCUMENTS

| | | | | |
|---|---|---|---|---|
| 5,319,183 | A * | 6/1994 | Hosoya | B23K 1/018 134/1 |
| 5,565,120 | A * | 10/1996 | La Rocca | B23K 26/123 219/121.67 |
| 5,767,479 | A * | 6/1998 | Kanaoka | B23K 26/40 219/121.61 |
| 6,060,683 | A * | 5/2000 | Estrada | H01L 31/1804 219/121.69 |
| 6,066,830 | A * | 5/2000 | Cline | B23K 26/073 219/121.69 |
| 6,273,326 | B1 * | 8/2001 | Graf | B23P 15/246 228/170 |
| 6,324,195 | B1 * | 11/2001 | Suzuki | B23K 26/0604 257/E27.125 |
| 6,407,363 | B2 * | 6/2002 | Dunsky | B23K 26/02 219/121.71 |
| 6,909,065 | B2 * | 6/2005 | Matsuda | H05K 3/225 219/121.18 |
| 7,671,295 | B2 * | 3/2010 | Sun | H01L 21/76894 219/121.6 |
| 8,604,381 | B1 * | 12/2013 | Shin | B23K 26/147 219/121.64 |
| 8,728,849 | B1 * | 5/2014 | Mattos | B23K 26/40 438/68 |
| 2002/0031899 | A1 * | 3/2002 | Manor | B28D 5/029 438/460 |
| 2003/0006221 | A1 * | 1/2003 | Hong | H01L 21/3043 219/121.72 |
| 2004/0112881 | A1 * | 6/2004 | Bloemeke | B23K 26/389 219/121.71 |
| 2004/0222202 | A1 * | 11/2004 | Johnson | B23K 26/382 219/121.69 |
| 2004/0247927 | A1 * | 12/2004 | Kurz | B23K 11/002 428/608 |
| 2005/0029236 | A1 * | 2/2005 | Gambino | B23K 26/361 219/121.69 |
| 2005/0115937 | A1 * | 6/2005 | Gu | B23K 26/0624 219/121.69 |
| 2006/0243708 | A1 * | 11/2006 | Ikenoue | H01L 21/76831 219/121.62 |
| 2008/0110230 | A1 * | 5/2008 | Guay | B23P 15/403 72/379.2 |
| 2010/0018956 | A1 * | 1/2010 | Watts | H01L 21/76894 219/121.72 |
| 2010/0122970 | A1 * | 5/2010 | Caristan | B25B 11/005 219/121.72 |
| 2010/0181165 | A1 * | 7/2010 | Finn | B23K 26/38 198/339.1 |
| 2011/0012258 | A1 * | 1/2011 | Omandam | B23K 26/0006 257/737 |
| 2011/0220625 | A1 * | 9/2011 | Pluss | B23K 26/0622 219/121.72 |
| 2011/0249340 | A1 * | 10/2011 | Niu | B23K 26/0006 359/614 |
| 2011/0287607 | A1 * | 11/2011 | Osako | B23K 26/364 438/462 |
| 2011/0312158 | A1 * | 12/2011 | Brunton | B23K 26/364 438/463 |
| 2012/0228275 | A1 * | 9/2012 | Heinrici | H01L 31/18 219/121.72 |
| 2013/0147881 | A1 * | 6/2013 | Redding | B41J 2/14233 347/71 |
| 2013/0256285 | A1 * | 10/2013 | Baxter | G01S 7/481 219/121.72 |
| 2013/0270239 | A1 * | 10/2013 | Wu | B23K 26/0846 219/121.72 |
| 2013/0291375 | A1 * | 11/2013 | Virtanen | G06K 19/07754 29/601 |
| 2014/0008341 | A1 * | 1/2014 | Krumm | B23K 26/38 219/121.78 |
| 2014/0151347 | A1 * | 6/2014 | Evangelista | B23K 26/40 219/121.69 |
| 2014/0291307 | A1 * | 10/2014 | Saegmueller | B23K 26/361 219/121.72 |
| 2015/0014889 | A1 * | 1/2015 | Goya | B23K 26/0869 264/400 |
| 2015/0121985 | A1 * | 5/2015 | Nunota | B65H 16/08 72/324 |
| 2015/0190883 | A1 * | 7/2015 | Erlwein | B23K 26/0869 219/121.72 |
| 2015/0214109 | A1 * | 7/2015 | Lei | H01L 21/3086 438/462 |
| 2015/0352671 | A1 * | 12/2015 | Darzi | B23K 26/38 219/121.71 |
| 2015/0360318 | A1 * | 12/2015 | Aubry | B23K 26/38 219/121.72 |

FOREIGN PATENT DOCUMENTS

| | | |
|---|---|---|
| DE | 102 35 903 A1 | 2/2004 |
| DE | 10 2008 006 241 A1 | 7/2009 |
| DE | 10 2013 203 385 A1 | 8/2014 |
| DE | 10 2013 215 346 A1 | 2/2015 |
| EP | 2420344 A1 | 2/2012 |
| JP | S60-174289 A | 9/1985 |
| JP | H10-015682 A | 1/1998 |
| JP | H10-071481 A | 3/1998 |
| WO | 2009/105608 A1 | 8/2009 |
| WO | 2014/131659 A1 | 9/2014 |

OTHER PUBLICATIONS

PCT/ISA/237, "Written Opinion of the International Searching Authority for International Application No. PCT/EP2016/0063317," dated May 17, 2017.

PCT/IPEA/409, "International Preliminary Report on Patentability for International Application No. PCT/EP2016/0063317," dated Sep. 21, 2017.

PCT/IPEA/408, "Written Opinion of IPEA for International Application No. PCT/EP2016/063317", dated May 17, 2017.

\* cited by examiner

METHOD FOR PRODUCING A SHEET METAL BLANK

RELATED APPLICATIONS

The present application is National Phase of International Application No. PCT/EP2016/063317 filed Jun. 10, 2016, and claims priorities from German Application No. 10 2015 210 847.3, filed Jun. 12, 2015, and German Application No. 10 2015 212 444.4, filed Jul. 2, 2015, the disclosure of which is hereby incorporated by reference herein in its entirety.

The invention relates to a method for producing a metal blank.

The prior art discloses, for example in WO 2009/105608 A1, a laser cutting apparatus transporting a metal strip in a transport direction, the metal strip being unwound from a reel or a coil. The laser cutting apparatus concurrently cuts metal blanks of a predetermined contour from the metal strip.

Today, especially for producing metal blanks in the area of the automobile industry, metal materials are used whose surface is coated with a layer, e.g., an aluminum-silicon protective layer. Such an aluminum-silicon protective layer protects the steel surface from scaling and corrosion during hot working.

If a metal blank is welded with another metal blank in the area of its edge of cut, material of the protective layer gets into the area of the weld seam. Impurity phases form in the weld seam, weakening the welded connection, which is unwanted.

In order to counteract this, DE 10 2013 215 346 A1 discloses removing, by means of a laser, the aluminum-silicon protective layer along a path corresponding to a later weld seam.

The prior art also discloses removing, by means of a laser or brushing, the protective layer in predetermined edge sections along the cut edge after a metal blank is produced by means of laser cutting. However, this is time-consuming and expensive. Despite the removal of the protective layer, unwanted weak spots do appear in the area of a weld seam that is produced later.

The goal of the invention is to eliminate the disadvantages of the prior art. In particular, the goal is to indicate a method and a device to produce a metal blank that allow the efficient production of a weld seam with fewer defects in the area of its cut edge.—Another goal of the invention is to indicate a method which can quickly and efficiently produce metal blanks from which material has been removed in predetermined surface sections on the top.

A first aspect of the invention is a proposed method to produce a metal blank with a predetermined contour, said method comprising the following steps:

Continuously moving the metal strip in a transport direction x;

Concurrently removing material from the surface of a top of a metal strip in at least one predetermined surface section by ablation using a first laser that is a component of a first removal device, and then Concurrently cutting the metal strip along a cutting path corresponding to the contour of the metal blank by means of at least one second laser that is a component of a cutting device provided downstream of the first removal device;

the surface section of an upstream metal blank being produced simultaneously with the cutting of a downstream metal blank.

In departure from the prior art, according to the invention material, for example an aluminum-silicon protective layer, is first removed from the surface of the metal strip. Following that, the metal strip is then cut according to the predetermined contour of the metal blank. It has been shown that metal blanks produced according to the inventive method can be welded with other metal blanks without the formation, in the weld seam, of unwanted impurity phases that weaken the weld seam.

The inventive method involves advantageously removing a predetermined surface section of the metal strip by ablation. The removal is done concurrently with the continuous movement of the metal strip. Simultaneously, the metal strip to produce the metal blank is concurrently cut downstream. The first and the second laser are advantageously movable independently of one another. In particular, the first and the second laser are not mechanically coupled with one another. The first and the second laser can be guided along different paths simultaneously.

The term "surface removal" is understood to mean that material in the surface section is removed from the surface to a depth of no more than 0.2 mm, preferably no more than 0.16 mm. A thickness of the metal strip is substantially greater than the thickness of the layer removed from the surface. The surface removal does not form any opening, slot, or anything similar in the metal strip. "Surface removal" can also remove oxide layers, oil layers, paint layers, impurities, or similar things from the surface of the metal strip.

According to one embodiment of the invention, step a) involves removing at least one first layer provided on the top. It is also possible for step a) to involve removing a second layer interposed between the first layer and a metal material. The composition of the first layer and, if applicable, the second layer differs from that of the metal material onto which they are applied. The first layer can be, for example, an aluminum-silicon protective layer or a zinc protective layer. The second layer can be an interlayer made of $FeAl_3$, $Fe_2Al_3$ arranged between the metal material and an aluminum-silicon protective layer.—The first layer can have a thickness in the range from 0.01 to 0.1 mm and the second layer can have a thickness in the range from 0.005 to 0.05 mm.

It is expedient if the removal in step a) is carried out by ablation by means of a first laser. The first laser can be a pulsed laser that produces, for example, 10 to 1,000 pulses/mm. The first laser can have a power in the range from 100 to 2,000 W, preferably 850 to 1,600 W. It can be a gas laser, e.g., a $CO_2$ laser, or a solid-state laser, e.g., a fiber laser, a diode laser, disk laser, or rod laser.

In addition, it is also possible for the removal in step a) to be mechanical. To accomplish this, it is possible to use rotating brushes or something similar.

According to the invention, the cutting of the metal strip in step b) is carried out by means of at least one second laser. This can be a conventional laser that is suitable for cutting metal material. To cut a metal strip, the second laser is advantageously moved according to the predetermined cutting path.

According to the invention, the metal strip is continuously moved in a transport direction x and both the removal in the surface section and the production of the cut along the cutting path are carried out concurrently. I.e., a laser ablation station can be provided, for example, in a conventional laser cutting apparatus upstream of a laser cutting station. In the laser ablation station, material is removed along the surface section on the top of the metal strip. Then, the surface section gets into the area of the cutting device or laser cutting station that is arranged downstream. The metal strip is then cut there.—The production of the surface section of an upstream metal blank and the cutting of a downstream metal blank are expediently done simultaneously.

According to an advantageous embodiment of the invention, the surface section comprises a first path, a course of the first path corresponding to at least one section of the contour of the metal blank and the metal strip being cut so that the cutting path divides the first path along the direction of its first longitudinal extension. This makes it possible to weld metal blanks together with other metal blanks along their cut edges.

According to another advantageous embodiment the invention, the cutting path runs about midway between the margins of the first path. In this case, the cutting path has a maximum distance to each of the two margins. This can safely and reliably avoid unwanted entrance of impurities located on the surface of the metal strip, in particular components of a protective layer, into the area of the edge of cut.

A first width B1 of the first path, this first width running perpendicular to the first longitudinal extension direction of the first path, is larger than a second width B2 of the cutting path, this second width running perpendicular to a second longitudinal extension direction of the cutting path. It is advantageous if the ratio between the first width B1 and the second width B2 satisfies the relationship:

$B1/B2=A$, where $A$ is a value in the range from 2 to 100.

The first width B1 is usually 0.5 to 4.0 mm. The second width B2 is usually 0.05 to 0.7 mm.

Usually a metal strip is coated with a protective layer not only on its top, but rather is also coated with such a protective layer on its underside opposite the top. In step a), material can advantageously be removed along a second path on an underside of the metal strip, the second path being essentially congruent with the first path when the first path is viewed from above. The previously mentioned advantageous embodiments used to produce the first path can also be used in an analogous manner to produce the second path.

According to one embodiment, the cutting path can also surround the at least one surface section. In this case, the surface section is advantageously round. It is expedient for the material on the surface of the metal strip to be removed in multiple successive predetermined surface sections. In this case, another piece of metal can be laid on the metal blank so that the surface sections are covered. A spot welding method can then be used to weld the other piece of metal to the metal blank.

A second aspect of the invention proposes a device to produce a metal blank, comprising:

A transport device to transport a metal strip in a transport direction x;

A first removal device for concurrent surface removal, by means of a first laser, of material in at least one predetermined surface section on a top of a metal strip;

At least one cutting device arranged downstream in a transport direction x for concurrent cutting, by means of a second laser, of the metal strip along a cutting path corresponding to the contour of the metal blank; and A controller for controlling the movements of the first laser and the second laser in such a way that the surface section of an upstream metal blank is produced simultaneously with the cutting of another metal blank that is downstream.

The inventive device allows the production of metal blanks whose surface is removed along the surface section. In the previously mentioned surface sections, the metal blank can be connected with another metal blank by means of welding, the weld seam produced being essentially free of impurity phases weakening the weld seam. The device allows rapid and efficient production of metal blanks that are intended to be welded together.

It is expedient for the controller to be a computer which controls the first removal device and the cutting device. The first removal device has a first laser as its removal tool. The cutting device has a second laser as its cutting tool. The movements of the lasers are controlled with drives provided in the first removal device and the cutting device so that material is concurrently removed in the predetermined surface sections of the sheet metal strip and downstream the metal strip is simultaneously cut along the contour of the metal blank. The movement paths of the first and the second laser can differ. In particular, it is also possible to provide multiple second lasers to cut the metal blanks, in order to shorten the duration of the cutting process, and thus adapt it to the duration of the ablation process.

According to an advantageous embodiment, the transport device comprises a roller straightening machine. It can also comprise transport rollers. The transport device advantageously continuously transports the metal strip is in a transport direction x. The metal strip can simultaneously be straightened.

According to another embodiment of the invention, the first removal device comprises a first movement device to move a first removal tool in a transport direction x and in a y-direction running perpendicular to it according to the predetermined first path. The movement device can be a conventional movement device, with which, e.g., a laser cutting head is moved concurrently with a metal strip to produce a predetermined contour. A suitable movement device is disclosed, for example, in US 2010/0181165 A1. A tool is put on an arm or a bridge so that it is movable in the y-direction, the arm or the bridge in turn being movable in the x-direction. The movements are usually made by means of servomotors, which are controlled with a computer-based controller. However, it is also possible to use a robot or something similar as a movement device. Concerning this, reference is made, for example, to the disclosure content of US 2010/0122970 A1.

According to one embodiment, the surface section is a first path corresponding to at least one section of the contour of the metal blank, and the cutting path divides the first path along its first longitudinal extension direction. This allow rapid and efficient removal of material in one area of the cut edges of the metal blank. In departure from the prior art, it is no longer necessary to position an already cut metal blank in a suitable way, to clean its cut edges, and to perform surface removal on the top and the underside in the area of the cut edges. The proposed device allows rapid and efficient production of metal blanks.

According to another embodiment of the invention, a second removal device is provided to perform surface removal of material on an underside of the metal strip opposite the top along another surface section forming a second path, the second path being essentially congruent with the first path when the first path is viewed from above. The second removal device allows, analogously to the first removal device, a removal of material from the underside of the metal strip. The second removal device expediently comprises a second movement device to move a second removal tool in the x-direction and y-direction, according to the predetermined second path. The first and the second removal device can be coupled with one another by control technology and/or mechanically, in particular to produce congruent paths.

The first and/or the second removal tool(s) is/are expediently a first laser or grinding tool. The first laser can be, for example, a pulsed laser, as is disclosed in DE 10 2013 215 346 A1. The removal of material can be supported by compressed air or inert gas, each with a pressure of at least 3 bar, on the laser spot of the laser beam impinging on the surface of the metal strip, at an acute angle with respect to the laser beam.

The cutting device comprises at least one second laser movable in the x- and y-direction according to the predetermined cutting path. The second laser can be a conventional laser which is suitable for cutting metal materials. It is also conceivable for the cutting device to be a mechanical cutting device, for example a concurrent shearing machine or something similar.

The inventive device further comprises a controller for controlling the movements of the first removal tool and the cutting tool. The controller can also additionally control the movements of the second removal tool.—The controller is, for example, a computer which stores the coordinates of the first path and of the cutting path. The coordinates correspond to the predetermined contour of the metal blank. If the metal strip is moved continuously, the movement paths of the cutting tool and removal tool are automatically recalculated or corrected by means of the controller according to the feed travel of the metal strip. To ensure that this correction or recalculation is especially exact, it is possible to provide a measuring device to measure a travel of the metal strip in the x-direction. It is also possible to be provide a device to transmit travel measurements measured with the measuring device to the controller. It is expedient for the controller to control all movements of the cutting tool and the removal tool simultaneously. This allows especially exact following of the predetermined contour of the metal blank and positioning of the cutting path within the respective path.

Figure 2:
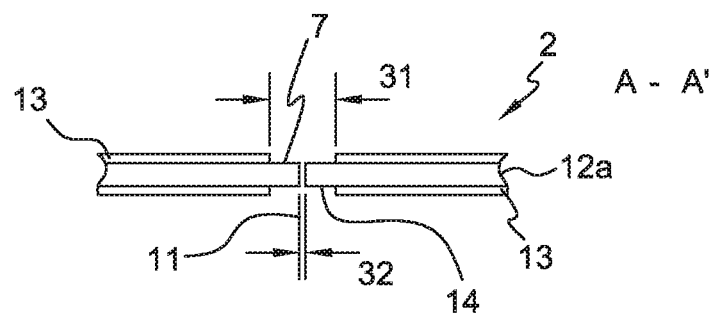
Figure 3:
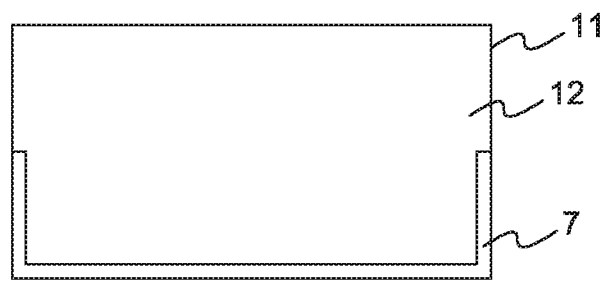

A sample embodiment of the invention is explained in detail below using the drawings. The figures are as follows:

FIG. 1 A schematic top view of an inventive device;

FIG. 2 A cross-sectional view through the metal strip along the line A-A' in FIG. 1;

FIG. 3 A top view of a first metal blank; and

Figure 4:
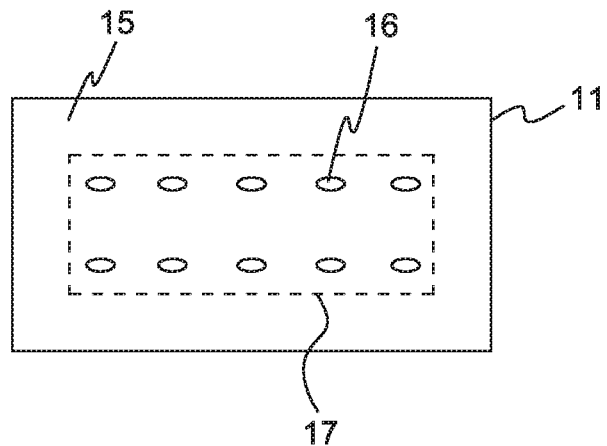

FIG. 4 A top view of a second metal blank.

FIG. 1 shows a schematic top view of a device according to the invention. Reference number 1 refers to a sheet metal reel or coil, which can be rotated about an axis Z. A metal strip 2 unwound from the reel 1 extends in a transport direction, that is, the x-direction. Downstream of the reel 1, a roller straightening machine 3 is provided, with which the metal strip 2 is straightened, and, preferably continuously transported in the x-direction. Downstream of the roller straightening machine 3, a first removal device 4 is provided, which is identified by a dashed line. The first removal device 4 comprises a first bridge 5 that spans the metal strip 2 and that extends in a y-direction extending perpendicular to the x-direction. The first bridge 5 can be moved back and forth in the x-direction, i.e., also opposite the transport direction x. The first bridge 5 has a first removal tool 6, e.g., a first laser, put on it, which can be moved back and forth in the y-direction over the entire width of the metal strip 2. Reference number 7 designates a first path, which has been produced by surface removal, by means of the first removal tool 6, on the top O of the metal strip 2.

Downstream of the first removal device 4, a first cutting device 8 is provided, which is in turn identified by a dashed line. The cutting device 8 comprises a second bridge 9, which spans the metal strip 2 in the y-direction. The second bridge 9 can be moved back and forth in the x-direction, i.e., also opposite the transport direction x. The second bridge 9 has a cutting tool 10, e.g., a second laser, put on it, which can be moved back and forth in the y-direction. The reference number 11 designates a cutting path, which has been produced with the cutting device 10. The reference number 12 designates a first metal blank, which has been completely cut out of the metal strip 2. The contour of the first metal blank 12 is delimited by the cutting path 11. The first path 7 extends along a section of the cutting path 11.

Instead of the previously mentioned gantry device, which comprises a bridge and a carriage that can be moved back and forth on it, it is also, of course, possible to move the removal and/or cutting tools along the predetermined movement paths by means of a robot or other suitable devices, for example. The movements of the tools can also be controlled, for example, on the basis of a polar coordinate system.

FIG. 2 shows a sectional view along the line A-A' in FIG. 1. The first path 7 has a first width B1, which is greater than a second width B2 of the cutting path 11 or of the cut. The metal strip 2 consists of a steel material 12a, which is coated, on its top O and on the opposite underside U, with a protective layer 13, e.g., an aluminum-silicon protective layer. Opposite of the first path 7 there is a congruently arranged second path 14. The protective layer 13 is removed along the first path 7 and the second path 14.

FIG. 3 shows a top view of the first metal blank 12. This once again makes it clear that the first path 7 borders sections of a contour of the first metal blank 12, the contour being delimited by the cutting path 11.

FIG. 4 shows a top view of a second metal blank 15. The second metal blank 15 has, within a contour delimited by the cutting path 11, multiple surface sections 16, from the top of which the protective layer 13 of the metal strip 2 has been removed. The surface sections 16 have the shape of a short path, a round or an oval shape. The surface sections 16 serve to produce a spot welded connection with another metal part 17, indicated here by a dashed line, that is to be connected with the second metal blank 15. In the second metal blank 15, the surface sections 16 do not border the surrounding cut edge of the second metal blank 15 produced by the cutting path 11.

The device operates as follows:

The metal strip 2 unwound from the reel 1 is straightened by means of the roller straightening machine 3 and is simultaneously continuously transported in the transport direction x. In the first removal device 4, a first removal tool 6, for example a suitable first laser, is concurrently moved along a predetermined contour of the first metal blank 12 to be produced. The corresponding movements of the first bridge 5 and of the first removal tool 6 are controlled by means of a controller S. Opposite the first removal device 4 it is possible to provide a second removal device (not shown here), with which a second path 14 is removed on an underside U of the metal strip 2 opposite the top O.—Not all applications require a second removal device.

After the production of the at least first path 7, the metal strip 2 is fed to the cutting device 8 that is arranged downstream. The cutting device 8 produces the cutting path 11, which corresponds to the predetermined contour of the metal blank 12 to be produced. The cutting path 11 divides the first path 7 along its longitudinal extension direction. Consequently, the protective layer 13 is already removed in the area of the cut edge before the cutting path 11 is produced. Subsequent production of the cutting path 11 by means of the cutting device 10 cannot bring any impurities into the area of the edge of cut.

According to another function of the device it is also possible, with the first removal tool 6, to remove surface sections 16 from the top O of the metal strip 2, which have the shape of a short path, a round or an oval shape. After that, the cutting device 8 that is arranged downstream can also guide the cutting path 11 so that the cutting path 11 does not cut the surface sections 16, i.e., the cutting path 16 surrounds the surface sections 16.

Although it is not shown in the figures, according to the inventive method it is obviously also possible to produce metal blanks which have a first path 7 at least sections of which are in the area of the cutting path 11, and surface sections 16 outside the cutting path 11, but within the contour. In addition, such metal blanks can also be provided with a second path 14 in the area of the cut edges, this second path 14 being opposite the first path 7.

The movements of the cutting device 10 are controlled by means of the controller similarly to how those of the first removal tool 6 are controlled. To accomplish this, it is possible to provide a measuring device (not shown in detail here), for example a drag wheel lying against the metal strip. The travel measurements made with it can be sent to the controller, allowing the movements of the first removal tool 6 and the cutting device 10 to be controlled in a suitable manner.

The inventive device and the inventive method allow rapid and efficient production of metal blanks on which material has been removed from at least sections of at least the top. The material can be, in particular, a protective layer, for example an aluminum-silicon protective layer or a zinc protective layer. Such metal blanks can be connected with another metal blank by means of welding in the area of the inventively produced surface sections. The welded connection produced is characterized by an especially small content of defects. Unwanted impurity phases within the weld seam can be avoided to the greatest possible extent.

LIST OF REFERENCE NUMBERS

1 Reel
2 Metal strip
3 Roller straightening machine
4 First removal device
5 First bridge
6 First removal tool
7 First path
8 Cutting device
9 Second bridge
10 Cutting tool
11 Cutting path
12 First metal blank
12a Steel material
13 Protective layer
14 Second path
15 Second metal blank
16 Surface section
17 Metal part
B1 First width
B2 Second width
O Top
S Controller
U Underside
x Transport direction
Z Axis

The invention claimed is:

1. A method to produce a metal blank with a predetermined contour, comprising:
providing a metal sheet in form of a reel or coil having a layer on a surface thereof, the layer being made of a material different from that of the metal sheet;
unwinding the metal sheet in the form of the reel or coil;
straightening the metal sheet being unwound from the reel or coil;
continuously moving the metal sheet in a transport direction;
moving, while the metal sheet is continuously moving in the transport direction, a first removal device having a first laser in the transport direction and a crossing direction crossing the transport direction, and removing a part of the layer on at least one predetermined surface section of the metal sheet where the metal sheet is to be cut,
continuously further moving the metal sheet in the transport direction after the layer is removed, and
moving, while the metal sheet is continuously moving in the transport direction, a cutting device having at least one second laser in the transport direction and the crossing direction, and cutting the metal sheet including a part of the metal sheet where the layer is removed,
wherein the cutting device is disposed at a downstream side of the first removal device in the transport direction and is operated while operating the first removal device at an upstream side in the transport direction.

2. A method according to claim 1, wherein in moving the first removal device, another layer disposed under the metal sheet is removed.

3. A method according to claim 1, wherein the part of the layer removed by the first removal device includes a first path, the metal strip being cut so that a cutting path divides the first path.

4. A method according to claim 3, wherein the cutting path entirely surrounds the at least one section of the metal sheet to be cut.

5. A method according to claim 3, wherein a ratio between a first width B1 extending perpendicular to a longitudinal extension direction of the first path and a second width B2 extending perpendicular to the longitudinal extension direction of the cutting path satisfies a relationship:

$B1/B2=A$, where $A$ is a value in the range from 2 to 100.

6. A method according to claim 1, further comprising:
preparing the metal sheet to have another layer on a surface opposite to the layer, and
in moving the first removal device in the transport direction and the crossing direction, removing a part of the another layer on at least one predetermined surface section corresponding to the predetermined surface section of the layer.

7. A method according to claim 1, further comprising welding the part of the metal sheet where the layer is removed to another material.

8. A method according to claim 1, wherein in removing the part of the layer on the at least one predetermined surface section of the metal sheet, the layer is further partly removed in an area where the metal sheet is cut by the cutting device, a portion where the layer is further partly removed being a welding portion for another material.

9. A method according to claim 1, wherein in moving the cutting device in the transport direction and the crossing direction, the cutting device cuts the metal sheet including the part of the metal sheet where the layer is removed and a part of the metal sheet where the layer is not removed.

10. A method according to claim 1, wherein the first removal device is the first laser, the cutting device is the second laser, and the first removal device and the cutting device are separated for a distance in the transport direction.

11. A method to produce a metal blank with a predetermined contour, comprising:
  providing a metal sheet in form of a reel or coil having a layer on a surface thereof and another layer on an opposite surface of the surface, the layer being made of a material different from that of the metal sheet;
  unwinding the metal sheet in the form of the reel or coil;
  straightening the metal sheet being unwound from the reel or coil;
  continuously moving the metal sheet in a transport direction;
  moving, while the metal sheet is continuously moving in the transport direction, a first laser in the transport direction and a crossing direction crossing the transport direction, and removing parts of the layer on at least one predetermined surface section of the metal sheet where the metal sheet is to be cut, and another layer disposed under the metal sheet,
  continuously further moving the metal sheet in the transport direction after the layers are removed, and
  moving, while the metal sheet is continuously moving in the transport direction, at least one second laser as a cutting device in the transport direction and the crossing direction, and cutting the metal sheet including a part of the metal sheet where the layer and another layer are removed,
  wherein the at least one second laser as the cutting device is disposed at a downstream side of the first laser in the transport direction, and is operated while operating the first laser at an upstream side in the transport direction.

* * * * *